United States Patent
Gurelli et al.

(10) Patent No.: US 6,847,809 B2
(45) Date of Patent: Jan. 25, 2005

(54) WIRELESS COMMUNICATION DATA RATE CONTROL PREDICTION METHOD AND SYSTEM

(75) Inventors: Mehmet Izzet Gurelli, San Diego, CA (US); Raul Hernan Etkin, Albany, CA (US)

(73) Assignee: Qualcomm Incorporated, San Diego, CA (US)

( * ) Notice: Subject to any disclaimer, the term of this patent is extended or adjusted under 35 U.S.C. 154(b) by 86 days.

(21) Appl. No.: 10/226,470

(22) Filed: Aug. 23, 2002

(65) Prior Publication Data

US 2004/0038658 A1 Feb. 26, 2004

(51) Int. Cl.$^7$ ............................................... H04B 17/00
(52) U.S. Cl. ................. 455/226.3; 455/226.1; 455/67.11; 455/67.13; 375/227; 375/225; 370/252
(58) Field of Search ............................ 455/226.3, 226.1, 455/226.2, 266, 67.11, 67.13, 423, 115.1, 115.3; 375/221, 222, 225, 227, 285; 370/252, 343, 431, 464, 476; 702/189, 191

(56) References Cited

U.S. PATENT DOCUMENTS

| 6,205,129 B1 | * | 3/2001 | Esteves et al. | 370/331 |
| 6,205,410 B1 | * | 3/2001 | Cai | 702/191 |
| 6,426,971 B1 | * | 7/2002 | Wu et al. | 375/227 |

* cited by examiner

Primary Examiner—Duc M. Nguyen
(74) Attorney, Agent, or Firm—Philip Wadsworth; Sandra L. Godsey; S. Hossain Boladi (57) ABSTRACT

Systems and methods for predicting the signal-to-interference-and-noise ratio (SINR) of the signal to be received by a mobile station transmitted from a base station in a wireless data communications system, for the purpose of forward link data rate control in the presence of partly periodic SINR fluctuations. The invention involves determination of a periodic mean SINR component in the received SINR process, and upon such determination the activation of a method which comprises a periodic mean SINR estimator, a subtractor which subtracts the periodic component from the received SINR process to produce an intermediate SINR process, a generic predictor which may be used to perform predictions on the intermediate SINR process, an adder which adds back an appropriate mean value to the intermediate SINR prediction. The resulting final SINR prediction is then used for rate selection.

2 Claims, 8 Drawing Sheets

WIRELESS COMMUNICATION DATA RATE CONTROL PREDICTION METHOD AND SYSTEM

FIELD OF THE INVENTION

The invention relates generally to wireless communications, and more particularly, to a mobile station data rate control predictor.

BACKGROUND

Wireless communication systems are divided into a number of geographic sectors. At least one base station is associated with a sector. Mobile stations within the sector can communicate with other mobile stations, within the same or a different sector, or with external networks, via the base station. At any given time, each mobile station typically communicates with only a single base station, however the base station must be able to communicate with all of the mobile stations within its sector.

Some base stations employ a scheduler to allocate resources among their serving mobile stations. One type of scheduler that may be used is referred to as a proportional fair scheduler. This scheduler is designed to balance fairness of service among the mobile stations against the maximization of overall throughput of data by the base station.

The base station scheduler typically operates on data rate requests from the mobile stations within the sector. The rate at which data can be reliably received at a given mobile station is determined by the signal-to-interference-and-noise ratio (SINR) of the signal received by that mobile station. A higher SINR level provides greater reliability and allows for a higher data rate. At lower SINR levels, transmissions are less reliable and lower data rates are used. Since mobile stations' SINR levels generally fluctuate, the supportable data rates also fluctuate.

The proportional fair scheduling algorithm accomplishes scheduling decisions by comparing the ratios of the requested data rates to the average throughputs of each mobile station. As a result of the SINR fluctuations seen by each mobile station, the scheduler tends to distribute service among the mobile stations, each at its peak data rate. Consequently, the scheduler achieves what is referred to as multi-user diversity gain. Multi-user diversity gain generally increases when the number of mobile stations in the sector increases, and when the dynamic range of SINR fluctuations seen by the mobile stations increase.

The SINR level at each mobile station may fluctuate for a number of reasons, including multipath fading and movement within a sector. There are also ways to increase the SINR fluctuations artificially. One way to do this is to use a certain type of forward power control (FPC) scheme that induces SINR fluctuations for each mobile station. In one such scheme, the base station transmits at full power through an antenna array. The phase of the signal fed to each array element is varied as a function of time, in a periodic manner. The resulting beam pattern sweeps through the sector periodically. As the beam sweeps across a particular mobile station, the SINR level for that mobile station peaks and then falls off according to the periodic variation.

A mobile station uses a SINR measurement to request the highest data rate from the base station that it can decode with low probability of error. Since the SINR level typically fluctuates, the mobile station can employ a predictor to forecast the average SINR of the next packet in time so as to avoid requesting too low or too high of a data rate. However, when the SINR fluctuations become too large, or the SINR varies too quickly, even the use of a predictor can lead to a requested data rate, which will either underutilize base station transmissions or otherwise lead to error.

SUMMARY OF THE INVENTION

Broadly speaking, the invention comprises systems and methods for SINR prediction and data rate control by a mobile station in the presence of signal-to-interference-and-noise ratio (SINR) measurements with time-varying periodic mean. This time-varying periodic mean may be the result of an FPC scheme implemented in one or more base stations as described above.

In one embodiment, the invention includes generating a predicted SINR of a signal to be received by a mobile station by first obtaining a measured SINR value, typically based on each pilot burst received from the base station, then subtracting a separately estimated periodic mean SINR component from this measured SINR value to obtain an intermediate SINR value, then performing an intermediate prediction on this intermediate SINR process, and finally adding the effect of the periodic mean SINR appropriately to the resulting intermediate prediction to obtain a final prediction. This way, the overall prediction accuracy is improved, because the intermediate SINR process that is fed to the intermediate predictor typically has less pronounced fluctuations than the measured SINR process since its time-varying mean is taken out. The invention may also include methods to detect the presence of a periodic mean SINR component in the measured SINR process based on which the above described method can be turned on or off. The invention may also include methods for dynamically reducing the final predicted SINR value to meet certain packet error rate requirements. The invention also includes certain methods of estimating the periodic mean SINR.

Another embodiment of the invention comprises a software application. The software application is embodied in a computer-readable medium, such as a floppy disk, CD-ROM, DVD-ROM, RAM, ROM, or the like. The computer-readable medium contains instructions which are configured to cause a computer to execute a method which is generally as described above. It should be noted that the computer readable medium may comprise a RAM or other memory which forms part of a computer system. The computer system would thereby be enabled to perform a method in accordance with the present disclosure and is believed to be within the scope of the appended claims.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment, which is described. This disclosure is instead intended to cover all modifications, equivalents and alternatives falling within the scope of the present invention, as defined by the appended claims.

DETAILED DESCRIPTION OF A PREFERRED EMBODIMENT

Figure 1:
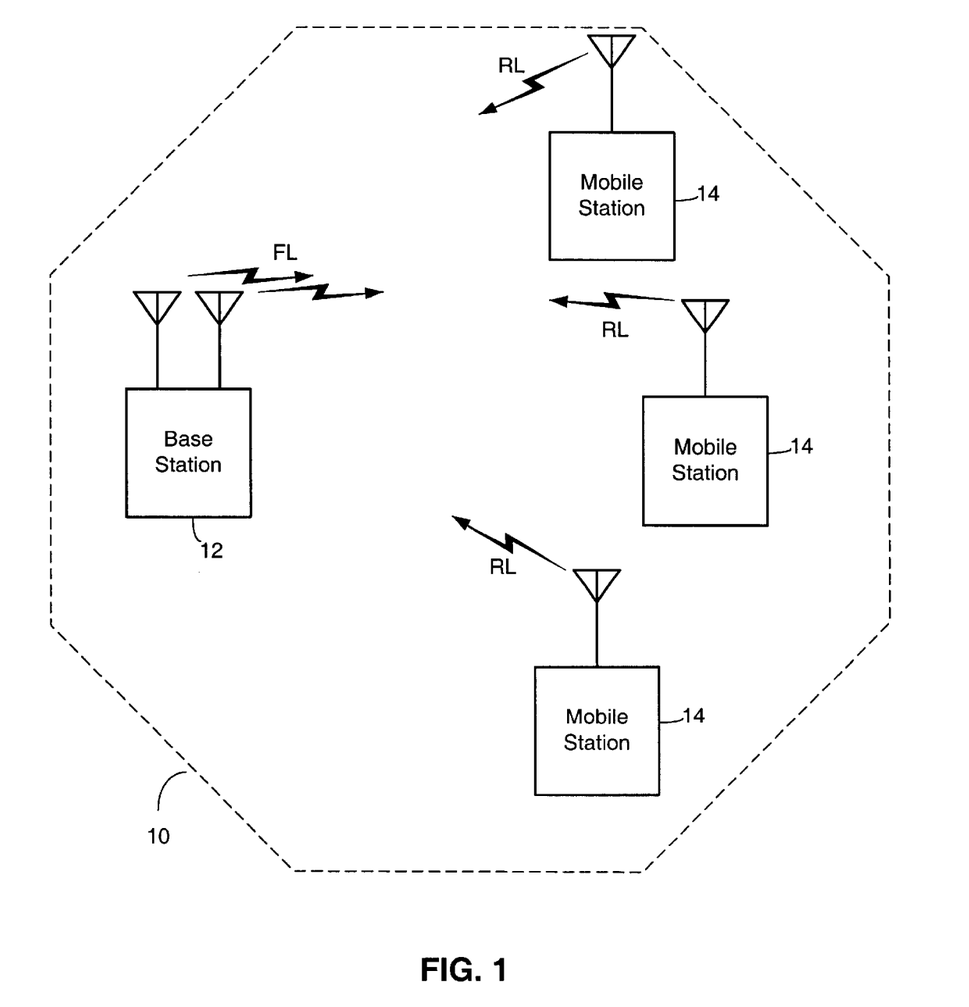
FIG. 1 is a diagram illustrating a wireless communication system in accordance with one embodiment.

Referring to FIG. 1, a diagram illustrating a wireless communication system in one embodiment is shown. In this system, a base station 12 and several mobile stations 14 are depicted. Base station 12 transmits data to mobile stations 14 via what is referred to herein as the forward link (FL). Mobile stations 14 transmit data back to base station 12 via what is referred to herein as the reverse link (RL). Mobile stations 14 are within the sector for which base station 12 has responsibility. Mobile stations may move within the sector, or they may move out of the sector associated with base station 12 and into a sector associated with another base station.

In one embodiment, the base station 14 may be configured to perform beamforming operations (such as in the FPC scheme described earlier) through the use of two antennas. ("Beamforming" is used herein to refer to the forming of a directional antenna gain pattern for the forward link of a base station.) One of the antennas transmits a data signal with a constant amplitude and phase, while the other of the antennas transmits the same data signal, but at a somewhat lower amplitude and with a phase shift. The two signals interfere with each other, constructively in some regions and destructively in others, resulting in a modified transmission pattern.

In another embodiment, the base station may have an array of transmission antenna elements with adjustable gains and phases. By varying these gains and phases periodically, a periodic time-varying antenna gain pattern can be obtained. The purpose of such induced time-variations may be to implement an FPC scheme at the base station to obtain multi-user diversity gain.

Other embodiments of periodically time-varying base station transmit antenna gain patterns are possible and may be implemented to increase the average sector throughput by multi-user diversity gain among other reasons. The important effect of all such implementations is that the SINR process, as seen by a mobile station will have an "almost periodic" mean value, since the signal received from the intended base station as well as the interference received from the unintended base stations are periodic. Here, "almost periodic" refers to the fact that by the motion of the mobile station and other effects, the otherwise periodic mean SINR will tend to change slowly in time.

Figure 2:
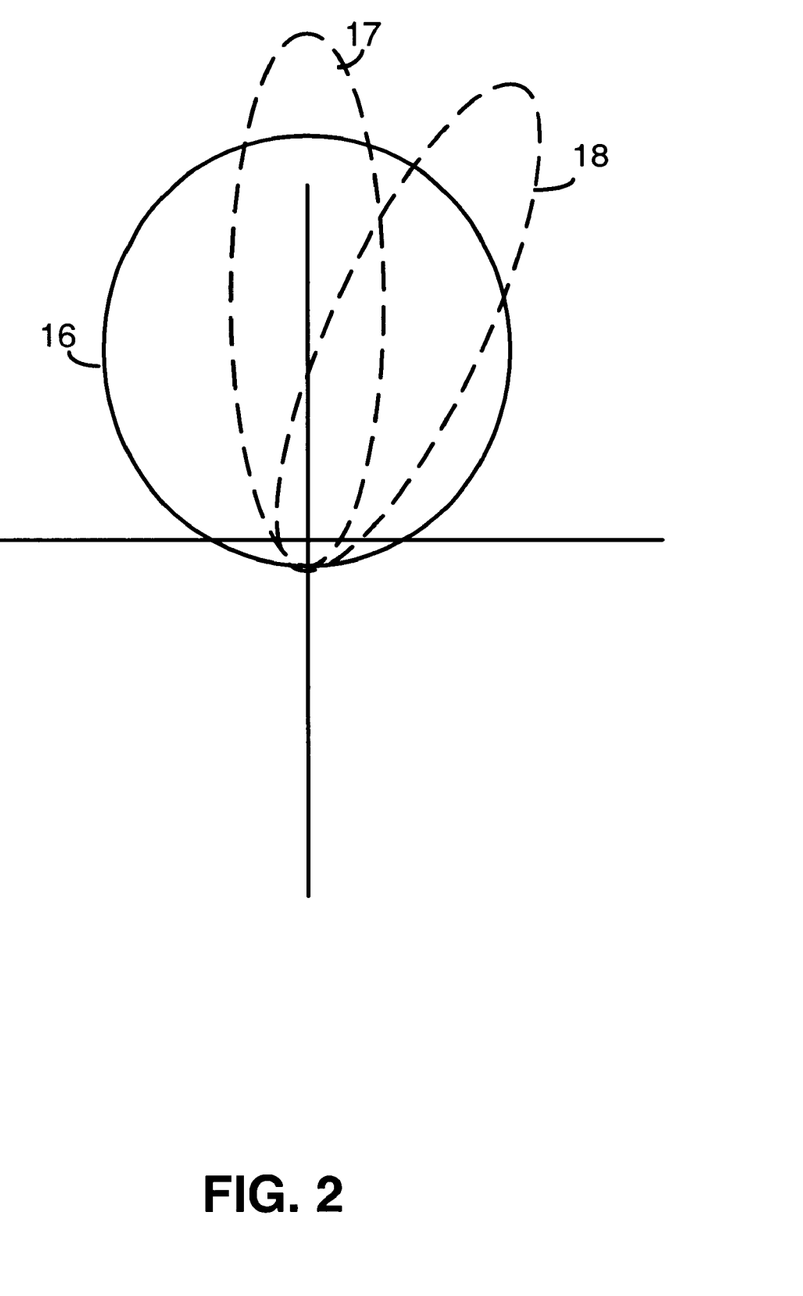
FIG. 2 is a diagram illustrating antenna gain patterns of a base station's forward link in one embodiment.

FIG. 2 illustrates one embodiment of a base station's forward link antenna gain pattern, which may contribute to fluctuations in SINR experienced at each mobile station within a sector. In the absence of any time-varying base station transmit antenna gain pattern, such as the two-element array where the phase-shifted version of the signal is applied to a secondary antenna, the antenna gain pattern of the forward link is generally time-invariant and broad enough to provide sufficiently strong signal to the mobile stations that may be located anywhere within the sector 16. The implementation of a time-varying antenna array for inducing multi-user diversity gain causes the antenna gain pattern to become narrower and more directional 17. By controlling the gain and phase of each of the array elements (such as the phase shift of the second signal in the two-element array), the antenna gain pattern can be varied with periodically scanning through the sector as in 18.

As the base station transmits signals (beamformed or otherwise), each of the mobile stations within the sector receives the signal, measures a SINR, selects a corresponding data rate that can be supported, generates a data rate control (DRC) signal, and transmits the DRC to the base station indicating this data rate. The mobile station may use a prediction algorithm to estimate SINR of a future signal, to avoid overly-high or overly-low data rates under fluctuating SINR conditions. The strength of the signal received by each of the mobile stations will vary as the beam transmitted by the base station sweeps through the sector. Each mobile station will continue to compute SINR levels and transmit DRCs to the base station as the beam sweeps through the sector. The SINRs and DRCs for a given mobile station will be higher when the beam is directed toward the mobile station, and lower when the beam is directed away.

The base station may be (but not necessarily) configured to track the DRCs received from each of the mobile stations and to identify the antenna array parameter values (such as the phase shifts) at which the DRCs are maximized for the respective mobile stations. Because the highest data rates can be achieved at these phase shifts, the base station may be (but not necessarily) configured to dwell on these antenna array parameter settings and to scan more quickly across parameter settings at which none of the mobile stations is optimized. As the number of users in the sector increases, assuming they are distributed roughly uniformly throughout the sector, this solution converges to the solution of periodically sweeping the entire sector with a highly directional time-varying antenna gain pattern. If such a system is implemented at the base station, the SINR process observed by a mobile station is likely to have an almost periodic time-varying mean.

A base station may have multiple transmission data rates. In a cdma2000 1×EV system, for example, there are 12 different requestable data rates ranging from 38.4 kbps to 2.4 Mbps, and many other rates that may result from the early decoding of packets. A data packet transmitted at 38.4 kbps requires a maximum of 16 slots to be transmitted, while a packet transmitted at 2.4 Mbps requires a single slot. (A "slot" in this system is a 5/3 millisecond period in which 2048 CDMA chips can be transmitted.) Typically, the performance of data transfers at a particular data rate (such as in terms of the packet error rate) drops off fairly sharply as a function of the SINR averaged over the packet transmission. Therefore for each rate, a SINR threshold can be determined. Above this threshold, the error rate is expected to be less than a predetermined amount (e.g., one percent). If the SINR is below this threshold, the error rate is expected to be above the predetermined amount. Thus, if the SINR of a signal received from a base station is at a certain level, a maximum data rate that can be supported at this SINR (e.g. one at which the error rate will be less than or equal to an acceptable level) can be identified.

From the perspective of a mobile station, the SINR varies as a function of time. The SINR may vary as a result of movement of the mobile station, changes in atmospheric conditions, obstacles within the path of signals, and various other factors. Because the SINR is variable, the mobile station is configured to dynamically select a data rate which is appropriate for the currently measured SINR. For example, if the SINR is very low, the mobile station may select a data rate of 38.4 kbps, or even null rate. If, on the other hand, the SINR is very high, a higher data rate can be supported, as high as 2.4 Mbps. The mobile station then transmits a DRC to the base station requesting that data be transmitted to it at the selected data rate.

In one embodiment, the mobile station measures the SINR based upon a pilot burst which is transmitted twice in every slot. The pilot burst consists of a 96-chip signal in the middle of each half-slot. This signal is received by all of the mobile stations within a base station's sector. Each mobile station computes its SINR based upon the pilot burst signal as received by that mobile station. It should be noted that, although this embodiment uses the pilot burst to measure the SINR, it may be possible to make this measurement based upon other portions of the signal received from the base station.

After the mobile station has measured the SINR of the pilot burst signal, it can select a data rate that can be supported. A DRC indicating the selected data rate is then transmitted back to the base station to request that data be transmitted to the mobile station at the selected rate. The SINR level can be measured every half slot and a corresponding data rate selected, and a DRC transmitted to the base station every slot, or up to 600 times per second. The requested data rate will then be maintained by the base station for that mobile station for a predetermined number of slots. Typically, this is two slots for a mobile station, which is active in a single sector, or four slots for a mobile station which is active in two sectors (in handoff between sectors).

The measurement of SINR is carried out concurrently by each of the mobile stations within a sector. Each mobile station will select a data rate that can be supported based on the measured SINR levels and will transmit its own DRC to the base station. The base station separately maintains the DRC's for the individual mobile stations and transmits data to the various mobile stations at the data rates requested by the respective mobile stations.

Because the mobile stations measure SINR levels and transmit appropriate DRCs back to the base station many times per second, the DRCs can be viewed as a function of time. More importantly, they can be viewed as a function of the form of the beam pattern of the forward link. In the embodiment described above, in which the beam pattern varies as a function of phase shift, the DRCs of the mobile stations can be correlated to the phase shift.

Figure 3:
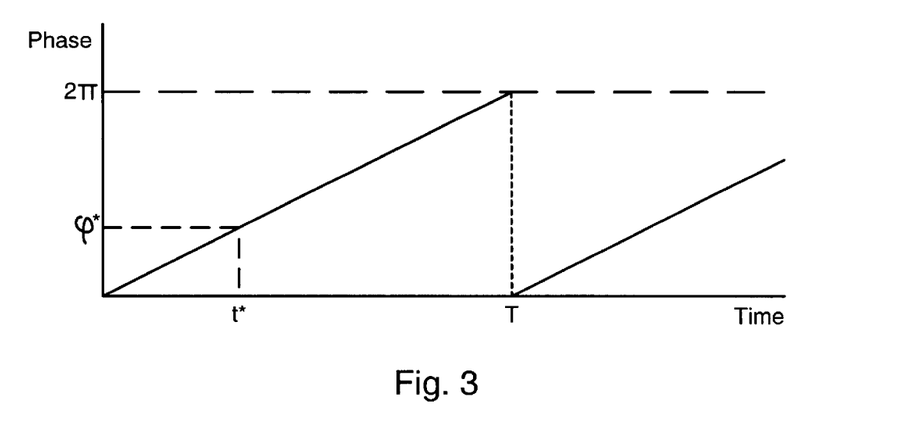
FIG. 3 is a diagram illustrating the phase shift of a secondary transmission signal with respect to a primary transmission signal in a dual-antenna base station in accordance with one embodiment.

Referring to FIG. 3, a diagram illustrating the phase shift of the secondary signal in a two-element array, with respect to primary signal, is shown for a beam that is rotating with a frequency of 1/T cycles per second. It can be seen that the phase shift increases linearly from 0 to $2\pi$ radians over a period of time T seconds, and then repeats. It should be noted that the phase shift of the secondary signal actually increases incrementally, but is depicted as continuously increasing for the sake of simplicity. The effect of the phase shift is to cause the antenna gain pattern formed by the base station to sweep through the sector with a period of T seconds (hence a frequency of $f_{FPC}=1/T$ cycles per second.)

As the beam pattern sweeps through the sector, each mobile station in the sector will measure the SINR of the received signal and transmit appropriate DRCs back to the base station. The SINR measured by the mobile station will vary essentially periodically in synchronism with the periodically time-varying antenna gain pattern, although there will be variations resulting from the movement of the mobile station and changes in the channel conditions. The base station may transmit information to the mobile stations relating to the period of the time-varying antenna gain pattern so that the mobile station can perform a more accurate prediction of the SINR by utilizing a method such as the invention described in this disclosure.

Figure 4:
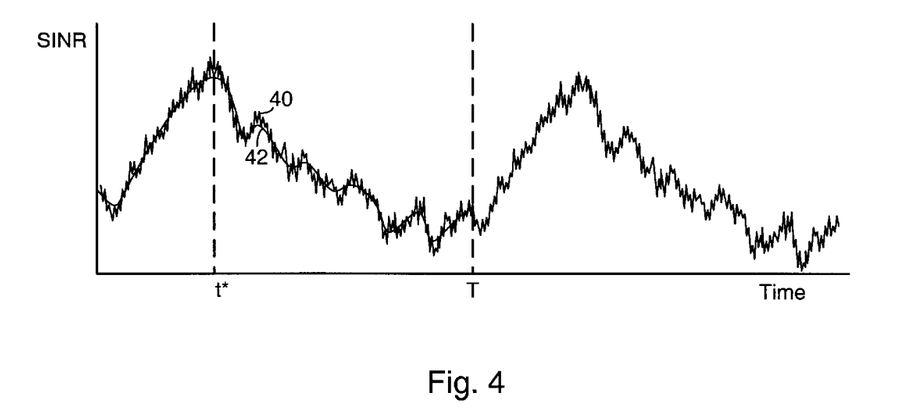
FIG. 4 is a diagram illustrating the signal-to-interference-and-noise ratio (SINR), measured by a mobile station in one embodiment as a function of time.

FIG. 4 illustrates a diagram of a SINR 40 as a function of time, measured by one mobile station in a system using a FPC scheme. It can be seen that the SINR is periodic with the same period as the time-varying base station antenna gain pattern. The SINR measured by the mobile station may contain measurement errors. Therefore, in one embodiment, the mobile station filters the measured SINR to obtain a more smooth curve 42 for the SINR.

Figure 5:
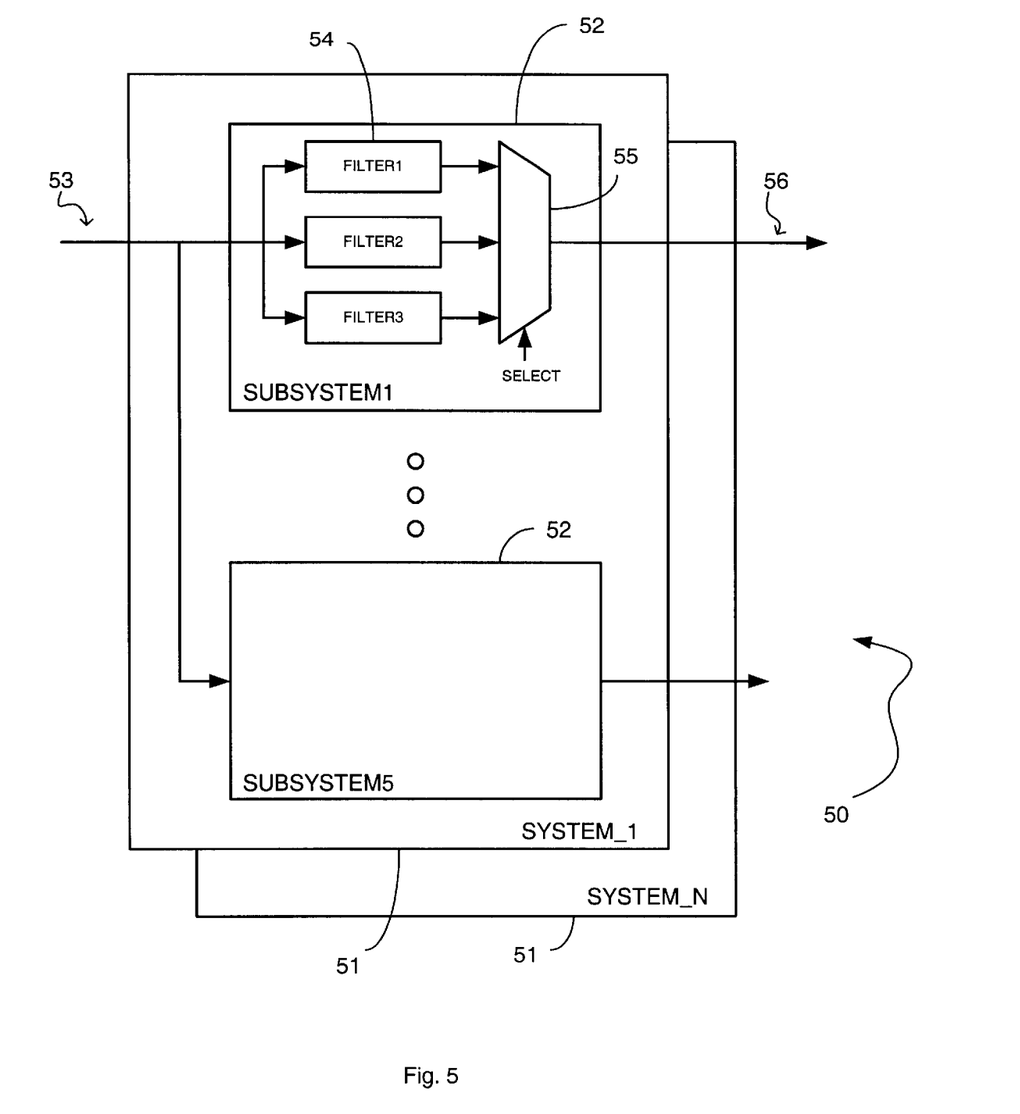
FIG. 5 is a diagram illustrating a predictor used by a mobile station to predict a suitable data rate for reliably receiving future base station transmissions.

In an embodiment, the mobile station uses a prediction and rate control algorithm to select the DRC. The purpose of this algorithm is to predict the average SINR corresponding to the next possible packet transmission intervals so that the mobile station requests the highest data rate that can be supported with sufficiently low probability of error. FIG. 5 illustrates a particular embodiment of a predictor 50 for executing the prediction and rate control algorithm. The predictor 50 includes a number of primary systems 51 (SYSTEM_1 to SYSTEM_N), each corresponding to one of N possible DRC lengths. Each primary system 51 includes a number of subsystems 52 (SUBSYSTEM1 to SUBSYSTEM5), each corresponding to a number of time slots used to transmit a data packet. In the cdma2000 1×EV system, there are five different packet lengths L=1, 2, 4, 8, or 16 slots. Therefore the primary system 51 will include five subsystems 52. This particular implementation of a predictor is not part of this invention. The invention that is described in this disclosure may be associated with any other forms of predictors.

Each subsystem 52 includes an input 53 for receiving a measured SINR based on the signal received by the mobile station. The measured SINR is sent through a number of filters 52 (Filter1, Filter2 and Filter3), each generating a candidate predicted SINR for a signal to be received by the mobile station. Various algorithms may be used to choose the most accurate candidate predicted SINR, which will be used to support a requested data rate for future transmissions to the mobile station. A selector 55 selects the chosen candidate predicted SINR, which is provided on output 56 for generating the DRC. The input 53 predictor 50 typically updated at every received pilot burst for continuous operation. Furthermore, not shown in FIG. 5 are various "backoff" calculations to reduce the predicted SINR by a dynamically set amount so that the mobile station requests packets that can be successfully decoded with high probability. Those having skill in the art would recognize that there are various ways of suitably implementing the predictor 50 within the scope of the embodiments described herein.

Referring back to FIG. 4, the predictor 50 may operate on a SINR process, which has periodic fluctuations. These fluctuations can be quite large, and can lead to a predicted SINR, which will differ significantly from an actual observed SINR of a signal for which the prediction is made. In order to avoid such error, an embodiment of the invention described in this disclosure includes a periodic mean SINR estimator, the output of which is subtracted from the measured SINR, and then an intermediate prediction is performed on the resulting difference signal utilizing an intermediate predictor such as 50 in FIG. 5. The final predicted SINR is obtained by adding an appropriate mean value obtained from a delayed and averaged version of the periodic mean SINR signal to the intermediate prediction.

Figure 6:
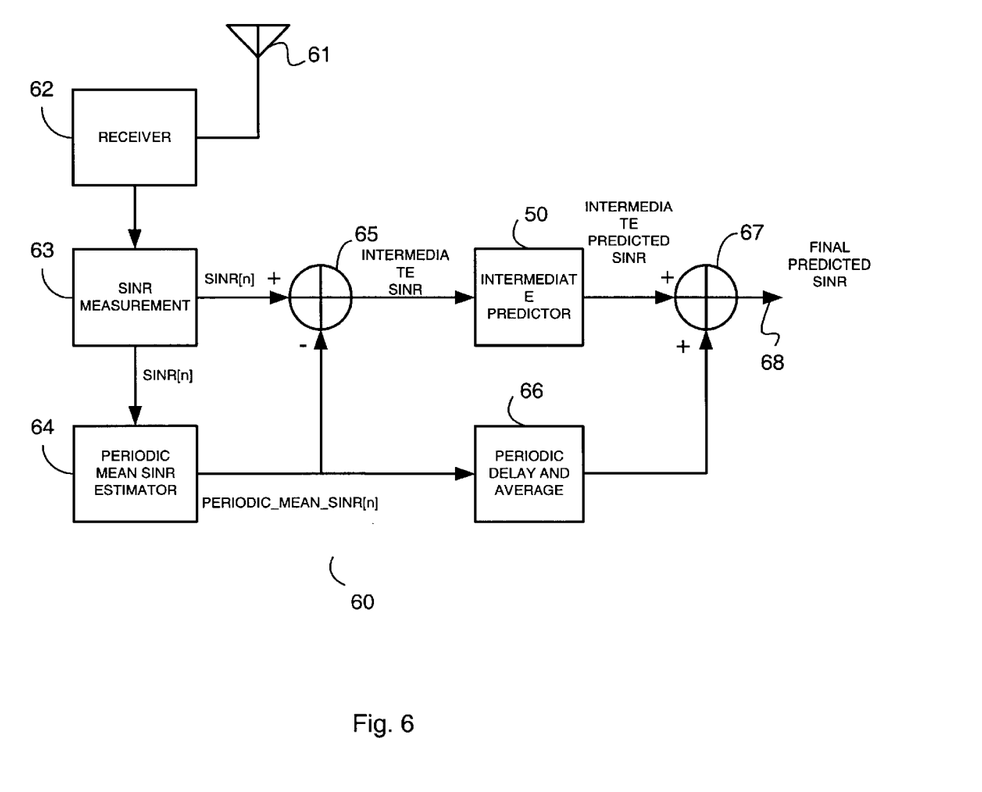
FIG. 6 is a diagram illustrating a Data Rate Control (DRC) prediction system including a periodic mean SINR estimator according to an embodiment.

FIG. 6 illustrates a block diagram of a SINR processor system 60. The system 60 includes an antenna 61 for receiving signals from a base station, and a receiver subsystem 62 for processing the received signals, such as decoding, deinterleaving, etc. A SINR measurement block 63 periodically measures (typically once every half slot) the SINR level. The SINR measurement block 63 may calculate a SINR on the pilot burst signals as described above, or use other portions of the received signals.

When the measured SINR from block 63 is determined to exhibit periodic properties, such as large up and down fluctuations, a periodic mean SINR estimator is enabled to calculate a periodic mean SINR from the measured SINR which is updated continuously in time. A subtractor 65 subtracts (in dB domain) the separately estimated periodic mean SINR from the current halfslot's SINR measurement, to produce an intemediate SINR. This reduces the amount of fluctuations in the signal that is fed to the intermediate predictor and relieves the intermediate predictor from the burden of predicting known periodic components. Overall effect is to improve the accuracy of the intermediate predictor. A properly delayed and averaged version of the separately estimated periodic mean is then added to the output of the intermediate predictor to produce the final prediction.

Figure 7:
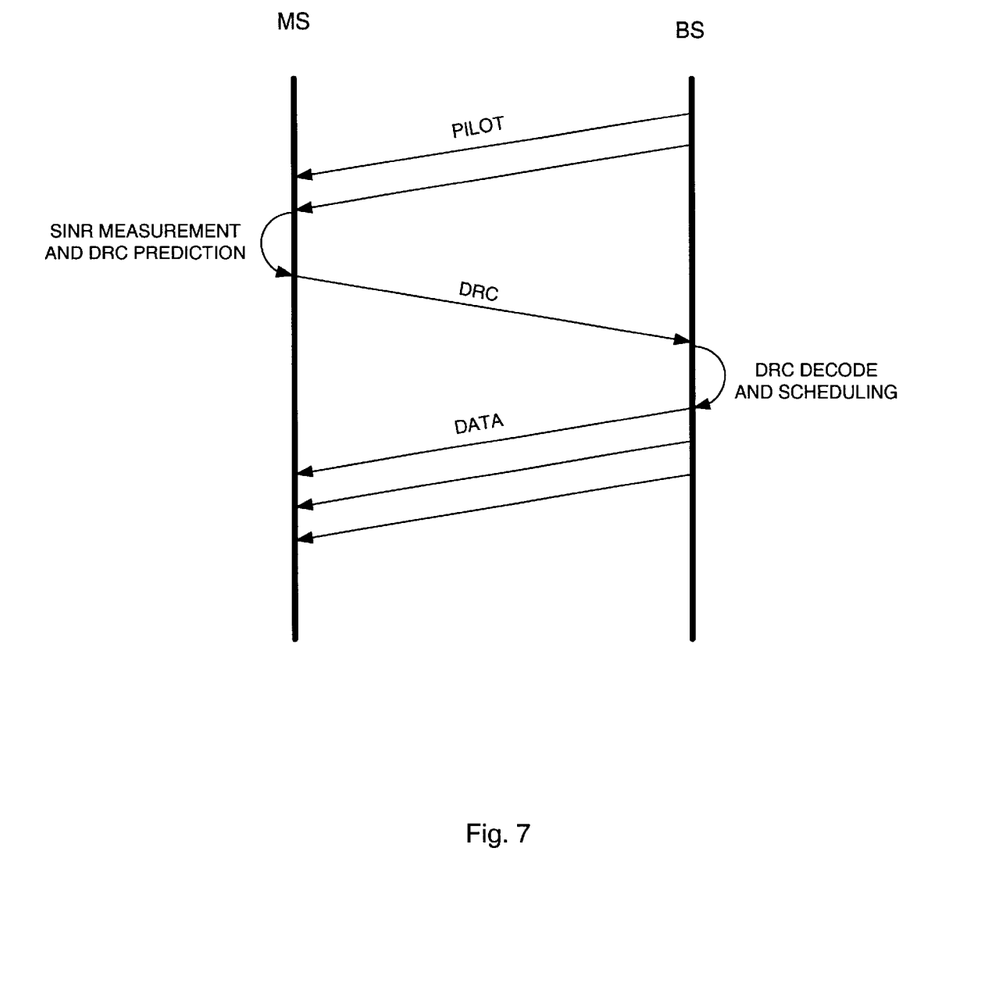
FIG. 7 is a timing diagram illustrating communications between a base station and a mobile station in one embodiment.

With reference to FIG. 7, a timing diagram is shown to illustrate communication between a base station (BS) and one mobile station (MS). The base station transmits a pilot burst signal every half slot, which is received by the mobile station. The mobile station performs a SINR measurement over each pilot burst signal. The mobile station keeps track of this measured SINR sequence to determine whether the SINR sequence exhibits periodic behavior. If the fluctuations are sufficiently periodic, a periodic mean SINR is estimated from the SINR sequence and subtracted from the current SINR measurement to produce an intermediate SINR, which is likely to exhibit less fluctuations compared to the original SINR sequence. This intermediate SINR is applied to a predictor, such as 50, to produce an intermediate SINR prediction. Finally, an appropriately delayed and averaged value of the periodic mean component is added back to this intermediate prediction to obtain a final prediction.

A DRC request is generated, based on the predicted SINR, to request a sustainable data rate for future transmissions from the base station. The DRC is transmitted by the mobile station and received by the base station. The base station decodes the DRC values from all mobile stations, and selects a mobile station by utilizing a scheduling algorithm. Then, the base station transmits data signals to the selected mobile station at a data rate requested by that mobile station.

Figure 8:
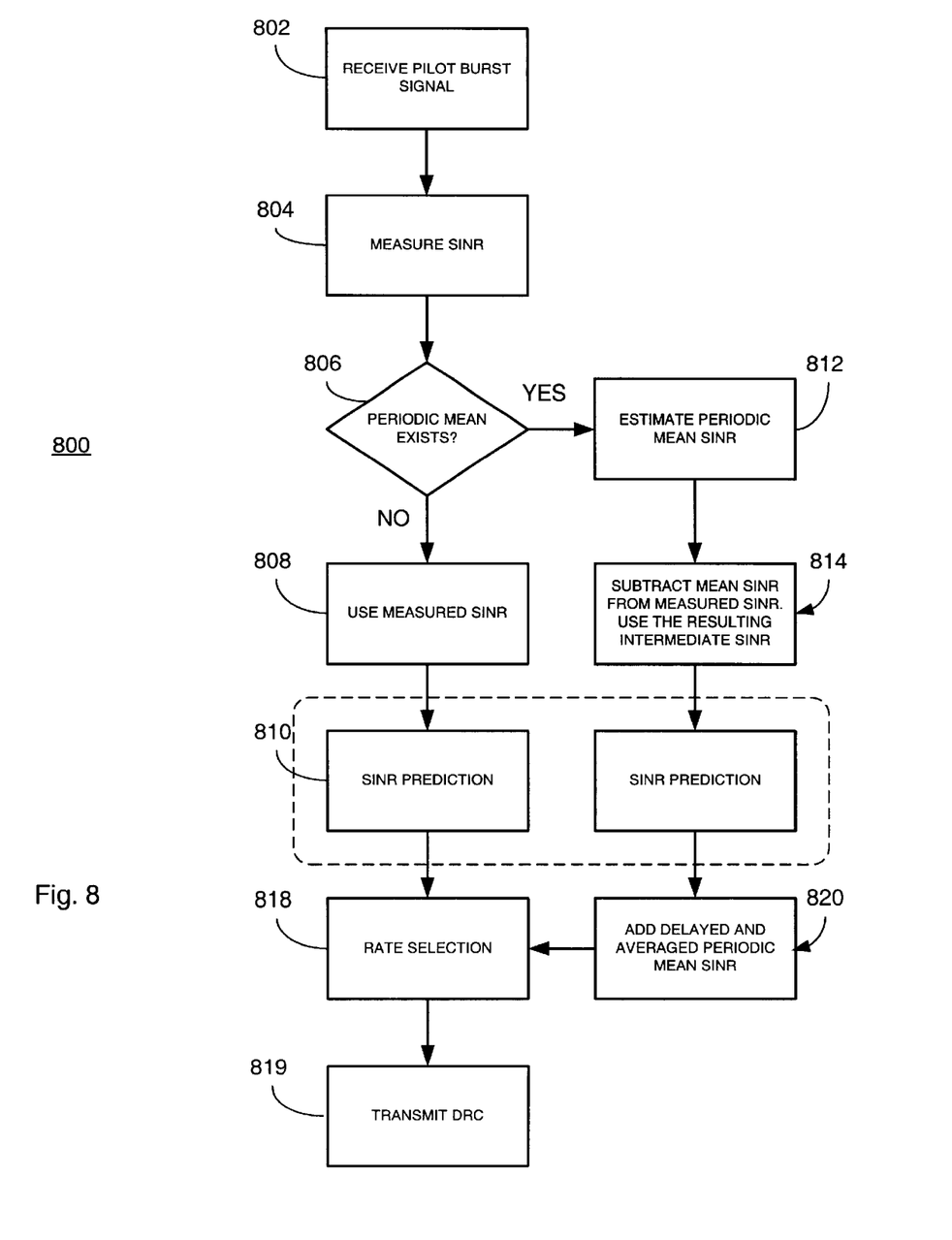
FIG. 8 is a flowchart illustrating a method of generating a DRC request according to one embodiment.

FIG. 8 illustrates a method 800 in which a SINR prediction is generated for a DRC request. At block 802, a mobile station receives a pilot burst signal transmitted by a base station within a sector. This is typically done every halfslot. A SINR measurement is performed based on the pilot burst or other parts of the received signal, at block 804. A determination is made at block 806 whether the measured SINR process exhibits a periodic mean. If the decision is "NO", then at block 810 the measured SINR is fed to the SINR predictor 810, the output of which is used for rate (DRC) selection 818.

If the decision at the output of 806 is a "YES," then the periodic mean SINR is estimated in block 812. At block 814, the periodic mean SINR is subtracted from the measured SINR (block 814) to produce an intermediate SINR. The intermediate SINR eliminates a significant part of the SINR fluctuations observed by the mobile station. The intermediate SINR is fed to block 810. An appropriately delayed and averaged periodic mean SINR is then added, the result of which is used in block 818 for rate selection. At block 819 the mobile station transmits the DRC request to the base station.

Note that although FIG. 8 shows two "SINR prediction" blocks 810 for clarity, only one instance is required. Furthermore, this SINR prediction block 810 can be based on any existing method, such as in 50 (FIG. 5), and is not detailed in this invention.

The determination of the existence of a periodic mean SINR 806 may be based on an information received from the base station as to whether the base station implements a time-varying antenna gain pattern (FPC scheme), and if so, the period of time variations. Alternatively, the mobile station may utilize any suitable algorithm for this determination.

The block 820 is used to add an appropriate mean value to the intermediate prediction. This mean value is obtained by averaging the periodic extension of the estimated periodic mean SINR over the future time interval that corresponds to the data packet for which the prediction is being performed.

One method to estimate the periodic mean SINR in 812 is as follows: First, the received measured SINR is smoothed by filtering with a possibly symmetrical finite impulse response filter in linear domain to obtain SINR_LIN[n] where n denotes the current time in units of number of half slots. The resulting sequence is converted to dB domain, and denoted by SINR_dB[n]. Then, the periodic mean SINR, denoted as PERIODIC_MEAN_SINR[n] is updated every halfslot based upon SINR_dB[n] by using the following recursion: First, the value of the expression $(1-\alpha)$ PERIODIC_MEAN_SINR[n modulo N]+$\alpha$ SINR_dB[n] is calculated where N denotes the period of the mean SINR (which may be informed by the base station) in units of number of half slots, and $\alpha$ denotes a filter coefficient. Then, the value of this expression is assigned back to PERIODIC_MEAN_SINR[n modulo N]. The value of the estimated periodic mean SINR for any given time n' (future or past) can be obtained by the periodic extension rule: PERIODIC_MEAN_SINR[n']=PERIODIC_MEAN_SINR[n' modulo N].

The periodic mean SINR may vary slowly in time as the mobile station moves and for other reasons. Therefore, it may not exactly be periodic. The estimation of the mean periodic SINR should take this into account. For example, the filter coefficient $\alpha$ described above should be small so as to obtain an averaging with a relatively large time constant for better extraction of the periodicity. On the other hand, $\alpha$ should be large enough so that the estimator can keep track of the slow changes in the periodicity of the mean SINR.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A signal-to-interference-and-noise ratio (SINR) prediction method for dynamic rate selection in a wireless data communications system, comprising:

detecting a periodic mean SINR component in a regularly measured SINR process based on a received signal from a base station;

activating, after said detecting, a periodic mean SINR estimation;

subtracting the estimated periodic mean SINR estimation from the measured SINR process to obtain an intermediate SINR;

performing intermediate prediction on the intermediate SINR to obtain an intermediate predicted SINR;

adding, after a delay period, an average of the estimated mean periodic SINR to the intermediate SINR prediction to obtain a final SINR prediction;

applying a dynamically determined backoff amount based on the final SINR prediction to control the packet error rate in said wireless data communications system.

2. An apparatus for a signal-to-interference-and-noise ratio (SINR) prediction for dynamic rate selection in a wireless data communications system, comprising:

means for detecting a periodic mean SINR component in a regularly measured SINR process based on a received signal from a base station;

means for activating, after said detecting, a periodic mean SINR estimation;

means for subtracting the estimated periodic mean SINR estimation from the measured SINR process to obtain an intermediate SINR;

means for performing intermediate prediction on the intermediate SINR to obtain an intermediate predicted SINR;

means for adding, after a delay period, an average of the estimated mean periodic SINR to the intermediate SINR prediction to obtain a final SINR prediction;

means for applying a dynamically determined backoff amount based on the final SINR prediction to control the packet error rate in said wireless data communications system.

* * * * *

UNITED STATES PATENT AND TRADEMARK OFFICE
CERTIFICATE OF CORRECTION

PATENT NO. : 6,847,809 B2
DATED : January 25, 2005
INVENTOR(S) : Gurelli et al.

It is certified that error appears in the above-identified patent and that said Letters Patent is hereby corrected as shown below:

Title page,
Item [74], *Attorney, Agent, or Firm*, please correct attorney "S. Hossain Boladi" to read -- S. Hossain Beladi --.

Signed and Sealed this

Ninth Day of August, 2005

JON W. DUDAS
*Director of the United States Patent and Trademark Office*